(12) United States Patent
Berookhim et al.

(10) Patent No.: US 12,542,838 B2
(45) Date of Patent: Feb. 3, 2026

(54) METHODS, DEVICES, AND SYSTEMS FOR DETERMINING A SUBSET FOR AUTONOMOUS SHARING OF DIGITAL MEDIA

(71) Applicants: Elliot Berookhim, Los Angeles, CA (US); Pejman Yedidsion, Los Angeles, CA (US)

(72) Inventors: Elliot Berookhim, Los Angeles, CA (US); Pejman Yedidsion, Los Angeles, CA (US)

( * ) Notice: Subject to any disclaimer, the term of this patent is extended or adjusted under 35 U.S.C. 154(b) by 0 days.

(21) Appl. No.: 18/589,370

(22) Filed: Feb. 27, 2024

(65) Prior Publication Data

US 2024/0205306 A1 Jun. 20, 2024

Related U.S. Application Data

(63) Continuation of application No. 17/848,739, filed on Jun. 24, 2022, now Pat. No. 11,917,037, which is a continuation of application No. 16/847,554, filed on Apr. 13, 2020, now Pat. No. 11,381,668, which is a continuation of application No. 15/985,275, filed on May 21, 2018, now Pat. No. 10,623,529, which is a (Continued)

(51) Int. Cl.
| | | |
|---|---|---|
| H04L 69/00 | (2022.01) | |
| G06V 30/242 | (2022.01) | |
| G06V 40/16 | (2022.01) | |
| H04L 67/06 | (2022.01) | |
| H04L 69/06 | (2022.01) | |
| H04W 4/02 | (2018.01) | |
| H04W 4/80 | (2018.01) | |
| H04W 8/18 | (2009.01) | |
| H04L 9/40 | (2022.01) | |
| H04L 51/52 | (2022.01) | |

(52) U.S. Cl.
CPC ............ *H04L 69/02* (2013.01); *G06V 30/242* (2022.01); *G06V 40/172* (2022.01); *H04L 67/06* (2013.01); *H04L 69/06* (2013.01); *H04W 4/023* (2013.01); *H04W 4/80* (2018.02); *H04W 8/18* (2013.01); *G06V 2201/10* (2022.01); *H04L 51/52* (2022.05); *H04L 63/107* (2013.01)

(58) Field of Classification Search
CPC .......... H04L 67/22; H04L 51/32; H04W 4/80; H04W 4/023; G06F 16/434
See application file for complete search history.

(56) References Cited

U.S. PATENT DOCUMENTS

| | | |
|---|---|---|
| 8,189,878 B2 | 5/2012 | Schultz |
| 8,291,095 B2 | 10/2012 | Cobb et al. |

(Continued)

OTHER PUBLICATIONS

International Search Report and Written Opinion for Serial No. PCT/US16/51187 mailed Dec. 28, 2016.

*Primary Examiner* — Tom Y Chang
(74) *Attorney, Agent, or Firm* — Command IP LLP; Pejman Yedidsion

(57) ABSTRACT

Methods, systems, and devices for determining a subset of users from among a set of users based on a set of received information associated with a photograph, where the disposition of the information is used to first determine the subset and then perform facial recognition on the subset of photographs for each user in order to accurately identify each user or users present in the photograph.

15 Claims, 8 Drawing Sheets

Related U.S. Application Data continuation of application No. 15/263,206, filed on Sep. 12, 2016, now Pat. No. 9,979,800.

(60) Provisional application No. 62/216,697, filed on Sep. 10, 2015.

(56) References Cited

U.S. PATENT DOCUMENTS

| | | | |
|---|---|---|---|
| 8,392,957 B2 | 3/2013 | Holt et al. | |
| 8,793,332 B2 | 7/2014 | Alsina | |
| 8,832,810 B2 | 9/2014 | Cheswick et al. | |
| 9,098,584 B1 | 8/2015 | Fredinburg et al. | |
| 9,195,679 B1 | 11/2015 | Svendsen | |
| 9,253,266 B2 | 2/2016 | Colangelo | |
| 9,262,596 B1 | 2/2016 | Steiner et al. | |
| 9,292,518 B2 | 3/2016 | Tseng | |
| 9,317,530 B2 | 4/2016 | Papakipos et al. | |
| 9,398,058 B2 | 7/2016 | Vuong | |
| 9,461,876 B2 | 10/2016 | Dusen et al. | |
| 9,549,227 B2 | 1/2017 | Campbell et al. | |
| 9,715,003 B2 | 7/2017 | Tseng et al. | |
| 9,823,724 B2 | 11/2017 | Vaccari et al. | |
| 9,979,800 B2 | 5/2018 | Berookhim et al. | |
| 9,986,289 B2 | 5/2018 | Soundararajan et al. | |
| 10,423,175 B2 | 9/2019 | Chang et al. | |
| 2008/0243861 A1 | 10/2008 | Wassingbo et al. | |
| 2011/0135168 A1 | 6/2011 | Hosoi | |
| 2012/0117633 A1 | 5/2012 | Chakra et al. | |
| 2012/0213420 A1 | 8/2012 | Steiner | |
| 2012/0250950 A1 | 10/2012 | Papakipos et al. | |
| 2012/0307080 A1 | 12/2012 | Yumiki et al. | |
| 2012/0308077 A1 | 12/2012 | Tseng | |
| 2012/0314917 A1 | 12/2012 | Kiyohara et al. | |
| 2012/0328163 A1 | 12/2012 | Panzer et al. | |
| 2013/0117365 A1* | 5/2013 | Padmanabhan | H04L 67/10 709/204 |
| 2013/0156274 A1 | 6/2013 | Buchmueller et al. | |
| 2013/0194438 A1 | 8/2013 | Sweet, III et al. | |
| 2014/0250126 A1 | 9/2014 | Baldwin et al. | |
| 2014/0250175 A1 | 9/2014 | Baldwin et al. | |
| 2014/0270407 A1 | 9/2014 | Balakrishnan et al. | |
| 2014/0341476 A1 | 11/2014 | Kulick et al. | |
| 2014/0344420 A1 | 11/2014 | Rjeili et al. | |
| 2015/0074206 A1* | 3/2015 | Baldwin | H04L 51/52 709/206 |
| 2015/0081791 A1 | 3/2015 | Jacobs | |
| 2015/0082404 A1 | 3/2015 | Goldstein | |
| 2015/0199305 A1 | 7/2015 | Li et al. | |
| 2015/0227782 A1 | 8/2015 | Salvador et al. | |
| 2015/0264573 A1 | 9/2015 | Giordano et al. | |
| 2015/0302030 A1 | 10/2015 | Vaccari et al. | |
| 2015/0302082 A1* | 10/2015 | Mallet | G06F 16/9535 707/738 |
| 2015/0350521 A1 | 12/2015 | Whitson et al. | |
| 2016/0021293 A1 | 1/2016 | Jensen et al. | |
| 2016/0034167 A1 | 2/2016 | Wilson et al. | |
| 2016/0088480 A1 | 3/2016 | Chen et al. | |
| 2016/0163029 A1* | 6/2016 | Gibbon | G06V 10/772 382/190 |
| 2016/0173622 A1 | 6/2016 | Ruben et al. | |
| 2016/0205238 A1 | 7/2016 | Abramson et al. | |
| 2016/0267285 A1 | 9/2016 | Ruben et al. | |
| 2016/0328868 A1 | 11/2016 | Tran et al. | |
| 2016/0353245 A1 | 12/2016 | Kulikov | |
| 2017/0041389 A1 | 2/2017 | Smith et al. | |
| 2018/0032997 A1 | 2/2018 | Gordon et al. | |

* cited by examiner

METHODS, DEVICES, AND SYSTEMS FOR DETERMINING A SUBSET FOR AUTONOMOUS SHARING OF DIGITAL MEDIA

CROSS-REFERENCE TO RELATED APPLICATIONS

This application is a continuation of U.S. non-provisional patent application Ser. No. 17/848,739, filed Jun. 24, 2022, which is a continuation of U.S. non-provisional patent application Ser. No. 16/847,554, filed Apr. 13, 2020, which issued as U.S. Pat. No. 11,381,668 on Jul. 5, 2022, which is a continuation of U.S. non-provisional patent application Ser. No. 15/985,275, filed May 21, 2018, which issued as U.S. Pat. No. 10,623,529 on Apr. 14, 2020, which is a continuation of U.S. non-provisional patent application Ser. No. 15/263,206, filed Sep. 12, 2016, which issued as U.S. Pat. No. 9,979,800 on May 22, 2018, which claims priority to and the benefit of U.S. Provisional Patent Application No. 62/216,697, filed Sep. 10, 2015, the contents of all of which are hereby incorporated by reference herein for all purposes.

TECHNICAL FIELD OF ENDEAVOR

The application relates to the field of digital media, more particularly, determining subsets of users for autonomous identification via facial recognition, based on a set of collected data.

BACKGROUND

Digital images and digital videos are often collectively referred to as digital media, visual media, or multimedia. Digital images and digital videos may be captured by a variety of devices. Once captured, most often the images and videos may be stored as a digital media file and digitally transmitted to other computing devices. In general, digital media may be considered any media that is encoded in a machine-readable format. Digital media may be created, viewed, distributed, modified and preserved on digital electronic devices. Accordingly, digital images and digital videos are considered to be digital media that may be processed by computer applications and software, via web pages and websites, including social media sites and applications. Digital imagery and digital video may be stored as digital data in databases. Accordingly, a plurality of images may be processed electronically into a digital format and transmitted to other devices for display and storage. The disclosed computing system may facilitate capturing, processing, and determining necessary data associated with such images, moving images, and the like, on electronic media, including streaming media.

SUMMARY

Embodiments may include methods, systems, and devices where, for example, a system embodiment may comprise a computing device, a first user equipment, and a second user equipment: where the first user equipment may comprise a processor and addressable memory, the processor may be configured to: transmit, to the computing device, a digital media file and a set of attributes, where the set of attributes comprise data collected over a predetermined period of time, and the transmission of the set of attributes may be on a continual basis based on a predetermined interval of time; where the computing device may comprise a processor and addressable memory, the processor may be configured to: receive, from the first user equipment, the transmitted digital media file and the transmitted set of attributes; associate the received set of attributes with the first user equipment, where the associated set of attributes may be stored in a data store; determine a subset of one or more second user equipment from a complete set of user equipment based on the received digital media file and the associated set of attributes, where the set of attributes of each of the user equipment of the complete set of one or more user equipment may be compared with the received set of attributes associated with the first user equipment based on determination of matching data points for each user equipment via accessing the data store; select the second user equipment from the determined subset of one or more second user equipment based on performing facial recognition algorithm via facial image comparison of the received digital media file and a set of one or more images previously associated with each of the determined user equipment in the subset of one or more second user equipment, the selection based on a successful comparison; and transmit, to the selected second user equipment, the digital media file; and where the second user equipment may comprise a processor and addressable memory, the processor may be configured to: receive, from the computing device, the transmitted digital media file.

In one embodiment, the set of attributes may comprise at least one of: GPS location data, GPS trail, Bluetooth ID of user devices proximate to the first user equipment, list of Bluetooth IDs of devices proximate to the first user equipment over a period of time, and Wi-Fi network ID associated with each user equipment. Additionally, the determination of matching data points for each user equipment may be based on comparison of each of the set of attributes associated with each user equipment. Optionally, the digital media file may comprise one or more digital photographs. In one embodiment, the first user equipment may be further configured to: transmit, to the computing device, the digital media file where the transmission of the digital media file may be based on an occurrence of a triggering event and where the triggering event may comprise capturing of a digital media by a user equipment. The system may be further configured to: transmit, to the second user equipment, the set of attributes associated with the first user equipment and transmit, to the second user equipment, the digital media file based on the second user equipment signaling that the attributes associated with the first user equipment, match locally stored attributes associated with the second user equipment. In one embodiment, the second user equipment may be further configured to: transmit, to the computing device, a set of attributes associated with the second user equipment, where the set of attributes comprise data collected over a predetermined period of time, and where the transmission of the set of attributes is on a continual basis based on a predetermined interval of time. Optionally, the successful comparison may be further based on receiving a matching score and the matching score for a user associated with the user equipment being above a threshold value.

Embodiments may include methods, systems, and devices where, for example, a device embodiment may include a processor and addressable memory, the addressable memory comprising a set of one or more rules, where the device may be in communication with a first user equipment having a processor and addressable memory and a second user equipment having a processor and addressable memory, and where the processor may be configured to: receive, from the first user equipment, a transmitted digital media file and a set of attributes, where the set of attributes comprise data collected over a predetermined period of time, and where the set of attributes is received on a continual basis based on a predetermined interval of time; associate the received set of attributes with the first user equipment, where the associated set of attributes is stored in a data store; determine a subset of one or more second user equipment from a complete set of user equipment based on the received digital media file and the associated set of attributes, where the set of attributes of each of the user equipment of the complete set of one or more user equipment is compared with the received set of attributes associated with the first user equipment based on determination of matching data points for each user equipment via accessing the data store; select the second user equipment from the determined subset of one or more second user equipment based on performing facial recognition algorithm via facial image comparison of the received digital media file and a set of one or more images previously associated with each of the determined user equipment in the subset of one or more second user equipment, the selection based on a successful comparison; and transmit, to the selected second user equipment, the digital media file.

Additionally, the set of attributes may comprise at least one of: GPS location data, GPS trail, Bluetooth ID of user devices proximate to the first user equipment, list of Bluetooth IDs of devices proximate to the first user equipment over a period of time, and Wi-Fi network ID associated with each user equipment, and where the determination of matching data points for each user equipment is based on comparison of each of the set of attributes associated with each user equipment. In one embodiment, the computing device may be further configured to: transmit, to the second user equipment, the set of attributes associated with the first user equipment; and transmit, to the second user equipment, the digital media file based on the second user equipment signaling that the transmitted attributes associated with the first user equipment match locally stored attributes associated with the second user equipment. In another embodiment, the device may be further configured to: receive, from the second user equipment, a set of attributes associated with the second user equipment, where the set of attributes comprise data collected over a predetermined period of time, and where the transmission of the set of attributes is on a continual basis based on a predetermined interval of time.

Embodiments include methods, systems, and devices where, for example a method embodiment may include the steps of: (a) transmitting, by a first user equipment comprising a processor and addressable memory, a digital media file and a set of attributes to a computing device comprising a processor and addressable memory, where the set of attributes comprise data collected over a predetermined period of time, and the transmission of the set of attributes may be on a continual basis based on a predetermined interval of time; (b) receiving, by the computing device, the transmitted digital media file and the transmitted set of attributes from the first user equipment; (c) associating, by the computing device, the received set of attributes with the first user equipment, where the associated set of attributes may be stored in a data store; (d) determining, by the computing device, a subset of one or more second user equipment from a complete set of user equipment based on the received digital media file and the associated set of attributes, where the set of attributes of each of the user equipment of the complete set of one or more user equipment may be compared with the received set of attributes associated with the first user equipment based on determining matching data points for each user equipment via accessing the data store; (e) selecting, by the computing device, a second user equipment from the determined subset of one or more second user equipment based on performing facial recognition algorithm via facial image comparison of the received digital media file and a set of one or more images previously associated with each of the determined user equipment in the subset of one or more second user equipment, the selecting based on a successful comparison; (f) transmitting, by the computing device, to the selected second user equipment, the digital media file; and (g) receiving, by the second user equipment, the transmitted digital media file from the computing device.

Optionally, the set of attributes may comprise at least one of: GPS location data, GPS trail, Bluetooth ID of user devices proximate to the first user equipment, list of Bluetooth IDs of devices proximate to the first user equipment over a period of time, and Wi-Fi network ID associated with each user equipment. Additionally, the determining matching data points for each user equipment may be based on comparing each of the set of attributes associated with each user equipment. One method embodiment may further comprise: transmitting, by the computing device, the set of attributes associated with the first user equipment to the second user equipment; and transmitting, by the computing device, the digital media file to the second user equipment based on the second user equipment signaling that the transmitted attributes associated with the first user equipment match locally stored attributes associated with the second user equipment. In another embodiment, the method may comprise: receiving, by the computing device from the second user equipment, a set of attributes associated with the second user equipment, where the set of attributes comprise data collected over a predetermined period of time, and where the transmission of the set of attributes may be on a continual basis based on a predetermined interval of time.

BRIEF DESCRIPTION OF THE DRAWINGS

Embodiments may be illustrated by way of example and not limitation in the figures of the accompanying drawings, and in which.

DETAILED DESCRIPTION

Figure 1:
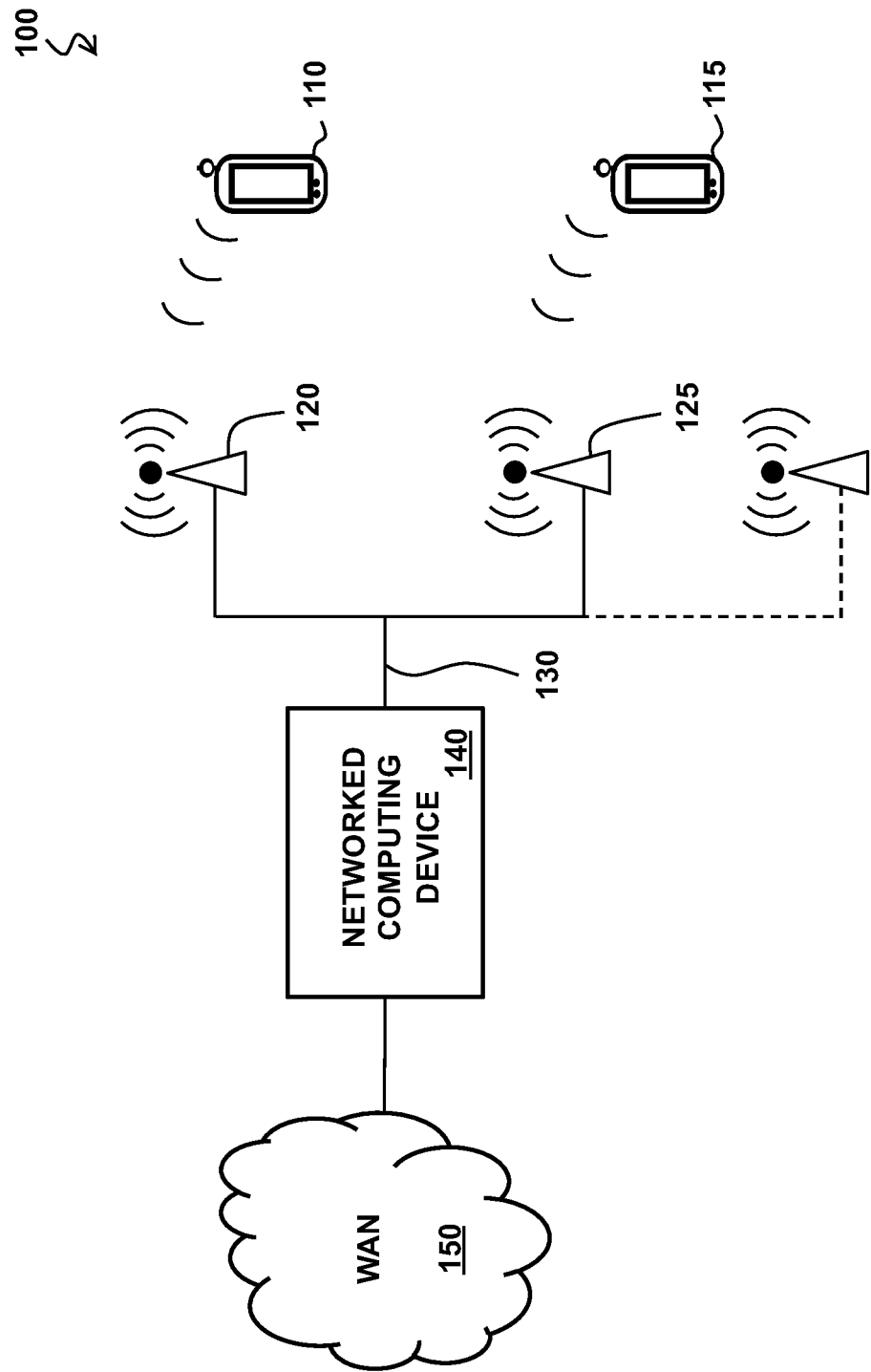
FIG. 1 depicts, in a functional block diagram, an exemplary embodiment of the networked computing device in communication with a set of client devices.

Exemplary embodiments of a computing system may comprise a device, e.g., an image-capturing device such as a mobile device with a camera or digital camera, comprising an operating system and data store, and a server computing device that may comprise an operating system, readable memory, and a data store. The system effects time efficient tagging and identification of digital images, such as photographs, taken by an exemplary mobile device and associating the photographs with users or non-users that are present in the photograph. The mobile device may comprise an application program running on the operating system to process photographs taken by the camera of the mobile device. The mobile device may then transmit/communicate the photograph along with a set of associated information to the server computing device which may then execute a series of steps in order to process the photograph. The mobile device may transmit the photograph and associated information to the server computing device via, for example, wireless Wi-Fi, wireless local area network (WLAN), or other wired or wireless networks with broadcast methods such as Long Term Evolution (LTE). The server computing device may connect and work with any such devices that may use LTE, Bluetooth, or WLAN, for example, mobile phones, specifically smartphones, personal computers, video game consoles, tablets, and/or digital cameras, to connect to a network resource such as the Internet via a wireless network access point. In one embodiment, the system may manage large numbers of mobile devices in a crowded environment, so as to identify the users and non-users whose device is being used to take or upload photographs to the server computing device. Embodiments of the computing system shorten time of identification in order to seamlessly share photographs with others present in the photograph with a high degree of accuracy. That is, the time needed to query a database of photographs may be reduced by a factor of=subset/set*V*N. Where V=processing time per operation and N=number of operations. Where the subset may be determined by using data attributes such as Bluetooth/Bluetooth Low Energy (BLE), Bluetooth history, Global Positioning System/Satellite (GPS), GPS trail, Wi-Fi network ID, social media account information, and history/record of users in the same photographs. Accordingly, the computing system may determine a set of associated attributes for a plurality of devices based on information gathered during a time span comprising a total sum of a device's history status prior to an event of a digital media capture.

In a computing device environment having a plurality of devices each comprising a processor and memory, each device may discover and collect information about other surrounding Bluetooth devices or BLE devices via scanning for and getting Bluetooth information. The Bluetooth information may comprise, for example: MAC address as a unique ID, Device Name, Bluetooth Address, Major Device Type, Minor Device Type, Detection Time, a company name of each Bluetooth device (determined according to the Bluetooth address), signal strength via Received Signal Strength Indicator (RSSI), etc. In one embodiment, the scanning device may add the name and unique ID of each device to an array or list in a database that may be stored locally on the device or uploaded to a networked server computing device. One exemplary mechanism for gathering such Bluetooth data may be to allow each device to attempt to connect to the nearby Bluetooth devices while not sending any information to the nearby Bluetooth devices, and only attempting to connect the device for testing purposes, then closing the connection. Thereby, a Bluetooth list or history may be determined for each device, where the Bluetooth history may comprise for each device, a set of other devices it may have been in proximity to over a predefined preceding period of time.

Similarly, the plurality of devices each comprising a processor and memory, may be proximate to and or connect to a wireless LAN (WLAN) network via Wi-Fi technology. In one embodiment, each device may store the name of the Wi-Fi networks in nearby range. This may be implemented by having the device scan for and store in a database, associated SSID, MAC address of the router or access point (BSSID), security types supported, channels used, signal strength, etc. of a Wi-Fi network. Accordingly, a list of nearby Wi-Fi networks that were detected by the device may be determined. Optionally, the device may be able to discover other computing devices or computers that are connected to a particular Wi-Fi network. As with the Bluetooth ID information, Wi-Fi network information may be, in one embodiment, added to an array or list in a database that may be stored locally on the device or uploaded to a networked server computing device. Thereby, Wi-Fi network information may be determined for each device, where the information may comprise for each device, a set of Wi-Fi networks it may have been in proximity to over a predefined preceding period of time.

Additionally, the processor of the device may have access to the GPS location (e.g., latitude and longitude) of the device and at any time, store that location, and or transmit the location to the networked server computing device. Optionally, the GPS location may be transmitted to the server computing device at a predefined number of times per hour and allow the server computing device to determine which of the two or more devices were located proximate to each other at a time a photograph was taken by one of the devices. That is, a GPS trail comprising a series of locations where each location in time—also referred to as spatio-temporal as belonging to both space and time or to space-time—may be obtained and stored in an array or list in a database. This determined GPS trail may be stored locally on the device and transmitted on predetermined intervals or based on the occurrence of an event. In one embodiment, each GPS location may be transmitted to the networked server computing device as each time the location is obtained, thereby allowing the networked server computing device to store and use this information. According to the GPS trail, the networked server computing device may be able to determine whether two or more devices have crossed paths over a specified period of time or duration. Thereby, a GPS trail may be determined for each device, where the GPS trail may comprise for each device, a set of other devices it may have been in proximity to over a predefined preceding period of time.

The exemplary mobile device may collect and store the associated information with each photograph via, for example, being granted access to the digital camera and/or photo gallery of the device. Additionally, access to the GPS, Wi-Fi, and Bluetooth components may be incorporated so as to allow the application running on the operating system of the mobile device to collect and store the relevant information associated with each photograph. That is, upon the launch and execution of the application program, the application program may begin to pull information from the device's Bluetooth component so as to determine a history of other Bluetooth devices that have been in communication or contact with the device. In one exemplary embodiment, the computing system may utilize BLE where compared to Classic Bluetooth, BLE (also called Bluetooth Smart) is intended to provide considerably reduced power consumption and cost while maintaining a similar communication range, accordingly, Bluetooth and BLE may be used interchangeable in the disclosed computing system. The application program may then create a trailing time line of devices, and in turn, associated users, that the device has come in contact with or been in close proximity to, over a specified period of time.

Additionally, once the application program is launched, and before a photograph is taken, the application program may be notified by the device's operating system of the GPS information associated with the device over a specified period of time previous to a photograph being taken, and this information may also be stored so as to create a GPS trail and track the different locations a user has travelled to with the device. Accordingly, once a photograph is taken—or optionally, even before a photograph is taken—the photograph and the associated information: GPS location, GPS trail, detected Bluetooth devices, Bluetooth history, Wi-Fi network IDs, and optionally social media login info may then be transmitted via the aforementioned mediums to the server computing device for processing.

In the exemplary computing system embodiments, once the server computing device receives a photograph and associated information and attributes from a user device, it then executes a series of steps based further on the user account, in order to process the received information. The server computing device may execute a script running on the operating system to launch a computer implemented method operating a recognition module configured to seek recognition of the identifiable details, including, performing facial image comparison between an image extracted from a set of previously uploaded photographs for that user account and the exemplary photograph captured by, and received from the mobile device. A facial image processing module may then be used to compare facial images, thereby to determine whether the user is present in the photograph. Numerous facial recognition and matching methods are known in the art and may be used for facial matching techniques. Additionally, biometrics information and data may be used for identification purposes, for example, physiological characteristics such as ones related to the shape of the body. Other examples may include, but are not limited to, fingerprint, palm veins, face recognition, DNA, palm print, hand geometry, iris recognition, retina and odor/scent. Additional characteristics that may be used may be related to the pattern of behavior of a person, including but not limited to typing rhythm, gait, and voice.

The server computing device may execute the following steps (not necessarily in this order) based on information collected from the user devices previous to and at the time a digital media is captured and saved, pushed, or uploaded to the server: a) determine a subset of user accounts based on whether the Bluetooth identification (ID) of the set of devices in the list of detected Bluetooth device history—transmitted as part of the associated information and attributes—matches a user already registered in the server with that Bluetooth ID, then perform a facial recognition check on the determined subset of users and determine whether any of the faces in the photograph were in contact, via Bluetooth, with the user's device at a certain time; b) if the user was not identified in the previous step, determine a subset of user accounts based on whether the GPS trail of the user's device matches being in the same location and at the same time as the GPS trail of another user then performing the facial recognition check on the determined subset of user photographs to determine whether any of the faces in the photograph have a facial recognition match; c) if the user was not identified in the previous step, determine a subset of users based on the identification of a Wi-Fi network they may be connected to, or may have been connected to, and then performing facial recognition on those users with shared, mutual, or similar Wi-Fi network IDs; d) if the user was not identified in the previous step, query the user's current user account or social media account for any other users who may be linked together and/or other users previously identified in a photograph with the current user to determine a subset of users to perform the facial recognition check on the subset of users and determine whether any of the faces in the photograph are associated with the user's connections on social media or previously were identified in a photograph together; and e) in the event that the previous steps are not successful in narrowing down the number of photographs, i.e., determining a subset, to perform facial recognition on, once a user is identified in a photograph by facial recognition, then look at the history of photographs in which the user was with other users and determining a subset to retroactively perform facial recognition on those photographs based on the assumption that this user may have other photographs in common with other users once the user is identified. Optionally, the server computing device may perform the step of narrowing the set of photographs to perform facial recognition on to when a new user is added or if a current user requests the application to make a search through existing photographs based on the provided parameters. Accordingly, the server computing device may first search for a set of users that were in photographs with previously, in order to determine if any missing unidentified faces were together in the same photograph.

In one embodiment, the server computing device, may determine a subset of users from a complete or entire set of users and their user devices that have been registered, by performing the following steps previous to the need for any facial recognition comparison checks. The complete or entire set of users may be stored in a data store, for example, an all-inclusive database of users. That is, starting with an initial subset, members, i.e., users and their devices, may be added at each step based on a system and method to determine whether a rationale exists for each user to be added to the subset based on whether they may have been in a photograph or video captured by a user device or user equipment. The method steps, though not necessarily in this order, may be executed based on a triggering event such as the capturing of a digital media, and may comprise the following steps: (i) scan, by the current user device, for surrounding Bluetooth device IDs (step A), transmit, by the current user device to the server computing device, the resulting Bluetooth device IDs (step B), and add, by the server computing device, any users who's Bluetooth ID is registered in the all-inclusive database of users, to the subset (step C); (ii) search, by the server computing device, Bluetooth history of the user (step A) and add any users whose Bluetooth ID appears on the Bluetooth history—signifying that they were in the proximity of each other at some point in the past—to the subset (step B); (iii) transmit the GPS location of the current user device to the server computing device (step A), compare, by the server computing device, the GPS location with the GPS location being transmitted by any other user to determine a match of the locations (step B), and add any other users who's GPS location matched the GPS location of the current user as a member to the subset (step C); (iv) determine, by the server computing device, what users of the set of all-inclusive database of users, were at the same location at the same point in time, over a previous determined period of time, based on comparing the GPS trail of the current user with the GPS trail of the other users (step A), and add those users to be a member of the subset of users (step B); (v) scan, by the current user device, for surrounding Wi-Fi network IDs (step A), transmit, by the current user device to the server computing device, the resulting Wi-Fi network IDs (step B), compare, by the server computing device, the current user device Wi-Fi network IDs received with any other user device Wi-Fi network IDs also received by the server (step C), determine whether any of the Wi-Fi network IDs match (step D), and add any other users having the same Wi-Fi network IDs to be a member of the subset of users (step E). Optionally, the server computing device may add any user who has ever been previously identified in the same photograph with the current user device that captured the new photograph, to the subset— with the assumption that perhaps these users may be likely to be in photographs together.

Accordingly, determining at each step whether a user may be included as part of the subset, may result in a smaller (or at worse equal sized) subset of users as compared to the all-inclusive set of users, on which facial recognition may be performed. It should be noted that all the foregoing steps may be either performed by the user device or server computing device interchangeably. In addition, the above steps may be performed in a manner where after each step where a new user is added to the subset, the facial recognition check is performed and the remaining steps is not executed once a facial match has been made. In this embodiment, the server computing device may ensure that the same user is not included in the subset once it is determined that there is no facial match with that user and the digital media being processed.

In one embodiment, the server computing device, may assign a weight to each of the previously identified steps before performing any facial recognition and based on a formulated system, determine a confidence factor or rating for each user that may have been in the exemplary photograph or video. That is, each step or category, e.g., Bluetooth, Bluetooth history, GPS, GPS trail, Wi-Fi, social media, previous contacts, may be given a different weight factor as part of a formulaic approach to determining whether a user may be included as part of the subset, on which facial recognition will be performed. Alternatively, a facial recognition score may also be part of the formula where based on all the accumulated data, i.e., score, a set of users may be identified—each with an associated score. Should there be multiple users identified, where the server computing device may not be able to definitively identify the user in the photograph or video—the server computing device may then ask the user operating the capturing device being used to take the photograph or video, to confirm whether the right person was identified. Accordingly, the absence of one metric/data may be compensated for by the presence of another, perhaps more highly weighted, metric/data. The server computing device may have all or none of the aforementioned metric/data available and associated with the exemplary photograph being processed and accordingly, may determine a more accurate identification determination of the user or users present in the exemplary photograph or video.

In an alternative embodiment, the server may first perform a facial recognition check on the photograph received from a user by comparing the faces in the photograph against a collective database of user faces, and once identified, use the associated data and attributes to confirm the accuracy. That is, once facial recognition is performed on a photograph, the results may then be cross verified by the server computing device via comparing the Bluetooth, Bluetooth history, GPS, GPS trail, Wi-Fi network comparisons, and other information to ensure the accuracy of the recognition. It is believed that facial recognition, as far as it has come, is not able to recognize faces without any errors and accordingly, the collected data, may be used to determine whether the results are as accurate as possible. For example, should there not be any other information as highlighted above (Bluetooth, Bluetooth history, GPS, GPS trail, Wi-Fi network comparisons), the server computing device may then revert to asking a user whether the person recognized by the facial recognition, is indeed that person. Additionally, negative data, i.e., data showing that one user was in fact in a different location than another user, may be weighted against that user, thereby contributing to the accuracy of the recognition and perhaps negating the returned recognition results, thereby preventing wrongly identification of users.

The embodiments of the computing system utilize a data store, for example, a database, where photographs and associated information and attributes may be stored and assigned to each user. The database may comprise user associated attributes, user identification, password, and initial user photograph, along with each photograph's date, GPS location, GPS trail, Bluetooth (or BLE) ID table, Bluetooth history, and other users or people identified via the facial recognition process. Additionally, the Bluetooth table and history may include a set of detected Bluetooth devices—via their Bluetooth ID—that have been detected via a Bluetooth scan and therefore, may be present in the proximate vicinity of the device at the time of taking the photograph or video or at a previous point in time. Accordingly, each photograph or video uploaded/pushed to the server may include with it, a table comprising all the Bluetooth IDs of the devices present at the time taken and also a history of all Bluetooth devices that were in the proximity of the device at some point within a previously determined period of time may be determined by the user device or server computing device. Based on the stored or saved Bluetooth device IDs that may be associated as part of the set of attributes with a photograph or video, upon a new user signing up with the server and enrolling a set of photos, the server computing device may query the database based on the user Bluetooth device ID and create a subset of users on which it would then perform facial recognition. Thereby, a new user may be able to be identified in a series of previously uploaded photographs or videos based on the server computing device determining a subset in which the new user may have been a part of based on being present in a nearby location, i.e., GPS, GPS trail, Bluetooth, Bluetooth history, or Wi-Fi check.

In one embodiment, each detected face, whether identified or unidentified, is assigned an identification number by the server computing device. Therefore, the server computing device may keep or save photographs of unknown users. In an exemplary embodiment where photographs may have been first taken of an unknown user and then that user subsequently signed up for the service, the server computing device may determine a subset of all users present within a predetermined distance of the GPS location of the device used to take the photograph. That is, a database search for all GPS locations that are within a specified distance from the location at which the user just signed up for the service and enrolled one or more photographs, may be performed. Accordingly, the subset may comprise any recent photographs taken of the new user at the location or event where they signed up for the service. Another embodiment may attempt to identify non-users at the time a photograph was taken who then become users at a subsequent time, by determining a subset each time the user—having recently signed up—is identified in a photograph with another user based on the above-mentioned methods. For example, if a first user is identified in a photograph with a second user, the exemplary computing system may then create a subset determined based on all the previous photographs associated with the second user and perform facial recognition on that set of photographs in order to determine if the first user was present in any of those photographs associated with the second user. Moreover, to identify a previously determined unknown user, as soon as one of the unknown users downloads the application, signs up for the service, and appears in a photograph with a current user, then the server computing device initiates the search of the subset comprising all the photographs associated with the current user for the new user.

FIG. 1 depicts an exemplary embodiment of a computing system 100 that includes a user equipment (UE) or user device, e.g., an image capture device, a digital camera, or a mobile device comprising an ability to capture images 110, a plurality of wireless local area network devices (WLANs) 120,125, a networked computing device 140 that may host a virtual network computing server, and a Wide Area Network (WAN) 150 that may provide access to the Internet or other content sources. In some embodiments, for example, a connection 130 may be established between the WLANs 120,125 and the networked computing device 140. In some embodiments, the networked computing device 140 may be connected to the WAN 150 and have access to the World Wide Web (Internet). The networked computing device 140 may be operably coupled to the WAN network 150 and may communicate with each other via various means, including, for example, wired or wireless network segments, such as radio frequency, infrared, and/or microwave. In some embodiments various protocols and programming languages may also be used, such as transmission control protocol (TCP) over Internet Protocol (IP) —TCP/IP, User Datagram Protocol (UDP) with multi-cast data communication plans, Real Time Protocol (RTP) for data streaming, hypertext transfer protocol (HTTP) with hypertext markup language (HTML), simple object access protocol (SOAP) with extensible markup language (XML), and other communication means adapted to operably connect the networked computing device 140 with the other devices within the computing system 100.

In an embodiment comprising multiple UEs, e.g., a first mobile device 110 and a second mobile device 115, the mobile devices 110,115 may execute a set of one or more applications via an operating system (OS) that may be running on the device. The applications may be in communication with the networked computing device 140 in real-time or near real-time, e.g., the application running on the first mobile device 110 and the application running on the second mobile device 115—via the operating system—and simultaneously transmit relevant information associated with each photograph to the server on the networked computing device 140. The server then, according to whether the steps of identifying potential users in the photographs were carried out successfully, populates each user account. That is, the rules which have been defined were executed and the networked computing device 140 determined that the Bluetooth identifier used for identification of the first mobile device 110 or the second mobile device 115 appeared or matched with one in the list of Bluetooth device history a user already registered in the server. For example, using a Device Identification Profile (DI) that is for specifying an aspect of Bluetooth-based wireless communication between devices, the networked computing device 140 may determine that the two devices—first mobile device 110 and second mobile device 140—were in close proximity and hence at the same location or event. Additionally, based on performing a facial recognition check on only a subset of photographs, the networked computing device may determine whether any of the users in the subset have appeared in the photograph, based on a facial recognition match. Accordingly, via Bluetooth device history, the networked computing device 140 may now identify and determine that the users who appear in the photograph would have wanted to share the picture with each other. That is, the application running on the mobile devices—and having access to the mobile phone's Bluetooth/GPS/Wi-Fi/social media account—now seamlessly facilitates the sharing of the photograph based on the Bluetooth information and facial recognition, thereby determining that the user of the first mobile device 110 and the user of the second mobile device 115 were at the same event or location and intended to share a photograph which was taken and had the two of them in it.

If a successful match is not made via Bluetooth, the networked computing device 140 may then determine whether the GPS trail of the user, e.g., first mobile device 110, matches being in the same location at the same time as the GPS trail of another user, e.g., second mobile device 115. In one embodiment, after the application has been launched, the application may be running in the background thereby providing a mapping history based on the GPS information from the mobile phone. The networked computing device 140 may then perform the facial recognition check comparison on a subset, i.e., limited set, of user profiles based on searching only the users that have the GPS trail belonging to their device match up together. Therefore, whether any of the faces in the photograph were in the same location at the same time as the user's device—at the time of capturing the photograph or at a point in the time previous to the capturing—is determined and the computing time is reduced by creating a subset of photographs, resulting in a more accurate and efficient search. Additionally, by having a running GPS trail (a graph of location vs time), should one of the mobile devices stop communicating with the networked computing device 140—be it because the battery has fully discharged or the device is no longer functioning—the networked computing device 140 may still determine a subset of users to search and perform facial recognition on, based on the GPS trail. That is, the networked computing device 140 may include the users who have come to be at the same location and at the same time during a previously determined length of time, in the subset and assume that the users may have ended up at the same location (even absent a GPS match at the time the photograph is taken) and may be present in each other's photographs. Accordingly, a GPS trail over a period of time may be mapped and the networked computing device 140 may determine whether one or more users were at the same location over a previously tracked period of time, signifying that there is a possibility they are present in photographs taken by either of the user devices.

In addition, embodiments of the networked computing device 140 may then, if the user was not identified in the previous steps, query a social media account of the user or list of contacts made available by the user, for any other users who may be linked and then performing the facial recognition check on the subset of connected users and determine whether any of the other users are associated with the user's connections on social medial. This may be done, for example, by searching the user's social media connections associated application profiles. Thereby determining a subset of user accounts and photographs to perform facial recognition on, and identify faces in the photographs to match. That is, the networked computing device 140 determines if the user's social media site connections indicate that the user of the first mobile device 110 and the user of the second mobile device 115 are connected and would have wanted to share the photographs taken, even in the absence of the Bluetooth history or GPS trail history.

The application may be executed in an environment where data that may include streaming data, for example, photographs, may be transmitted to and received by a computing device. The exemplary mobile devices 110,115 may perform error correction and or error concealment schemes for the photograph and associated data being transmitted to the networked computing device 140, thereby allowing the user to transmit over any connection speed. The application may further provide a convenient user interface to view the photographs in which they were matched and then upload to social media services such as Twitter®, Instagram®, and/or Facebook®.

According to the embodiments of the computing system 100, a user at an event may not need to ask a picture taker to "send them the picture" they were in. The system facilities the sharing of photographs so long as the application is running on the mobile device at the time or at a previous point in time, the picture was taken. The application running on the mobile device or client, by transmitting the relevant information to the networked computing device or server, triggers the networked computing device to begin processing the photograph, whether or not any other users with their mobile devices are also running the application, and communicating with the networked computing device. In an alternative embodiment, photographs and relevant information and data attributes may be saved on the user device and uploaded at a later time. That is, the networked computing device processes the photographs and associated information that are received and in turn stores the processed data in a data store in communication with the networked computing device. This allows for the processing to occur at a later time which may be after a user has joined and created a profile with the service running on the networked computing device.

Figure 2:
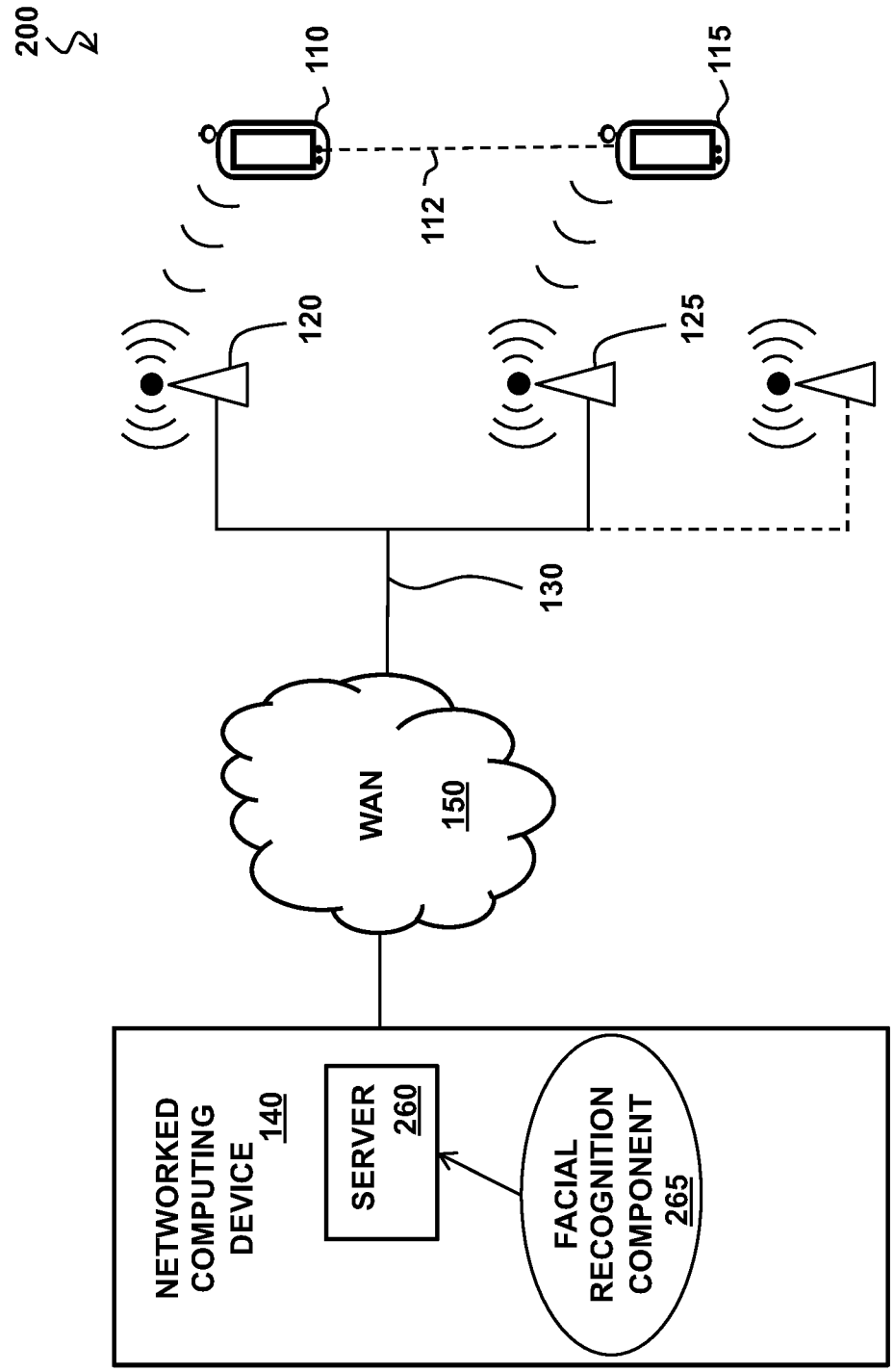
FIG. 2 depicts, in a functional block diagram, an exemplary embodiment of the networked computing device as communicating with a set of client devices via a WAN.

FIG. 2 depicts the computing system of FIG. 1 where the networked computing device 140 is outside of a network and the mobile devices 110,115 are in communication with the server 260 running on the networked computing device 140 via the WAN 150. The computing system of FIG. 2 may also comprise a set of one or more servers 260 that may provide overall system management and control. Management functions may include: system features, style and appearance for the mobile application, client activity monitoring and reporting, data monitoring for system balancing, user identification, face recognition and matching component 265, and ability to communicate with mobile devices 110,115. Additionally, a direct communication medium 112 between the mobile devices 110, 115 may be implemented where, optionally, the devices may send and received digital media, e.g., photographs, directly to each other. In this embodiment, as depicted, the direct communication may be established based on a received communication or signal from the networked computing device 140. That is, in one exemplary embodiment, once the networked computing device 140, via the server 260 and facial recognition component 265, has identified a user in a photograph based on the received information and attributes, the server 260 may signal to the first mobile device 110 to transmit the photograph directly to the second mobile device 115. In one embodiment, the communication medium 112 may be established ad hoc and via an exemplary communication protocol to allow two or more entities of a communications system to transmit information via any variation thereof. Various means for establishing such communication protocols may be well known in the art. Additionally, the communication may be through another channel already present to the mobile devices 110, 115, for example, Multimedia Messaging Service (MMS), Bluetooth, RFID, Beacons, etc. and utilized in order to circumvent having to transmit the photograph or a preview of it, from the server to the receiving mobile device and adding additional delays.

In one embodiment, so as to ensure accuracy of the facial recognition component 265 subsequent to the networked computing device determining a subset of user devices and selecting the user device which the digital photograph should be sent to, another step may be performed. For example, if the user of the second user device 115 was identified to be in a photograph taken by the user of first user device 110, once determined that the photograph is to be transmitted by the networked computing device to the second user device 115, a final confirmation may be performed. In that step, the networked computing device 140 may transmit the received information and attributes which the server 260 based the subset determination on, to the second user device 115 before transmitting the digital photograph itself. The second user device 115 may then compare the attributes associated with the photograph in question with a set of up to date attributes available locally on the user device 115 itself to ensure that there is a match between at least one of the attributes, e.g., same Wi-Fi network ID. That is, by ensuring as a last check that the second user device 115 was at some point present in the proximity of the first user device 110 and giving way to the likelihood that the user of the second user device 115 may have been present in a photograph taken by the user of the first user device 110, the accuracy of facial recognition and other data is confirmed and validated. Based on the successful validation of at least one of the attributes matching, a signal from the second user device 115 may be sent to the server 260 to confirm that the photograph taken by the first user device 110 should be transmitted to the second user device 115.

Additionally, in one embodiment, the user device 110 may have the ability to capture digital media but not be able to connect directly to the server and/or not be able to have access to GPS location, Bluetooth IDs of other devices, Wi-Fi networks and other attributes discussed herein. According to this embodiment, the first user device 110 may directly communicate with a second user device 115, via the communication medium 112 and transmit the captured digital media files. That is, the second user device 115, being a mobile device, may act as the device which is collecting the necessary data: GPS location, Bluetooth IDs, Wi-Fi networks, and then transmitting the digital media file to the networked computing device 140 for processing.

Figure 3:
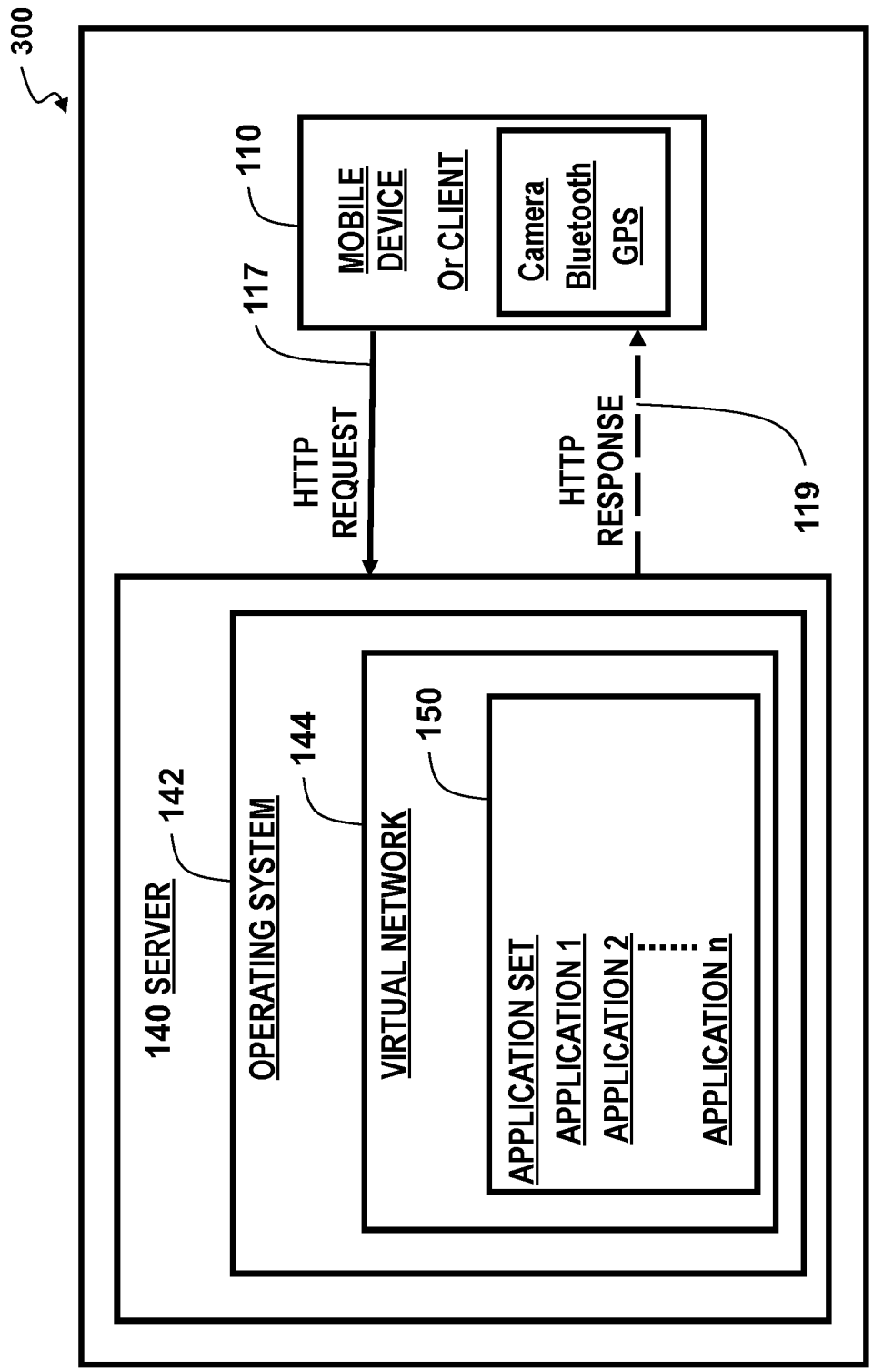
FIG. 3 depicts a server and a mobile device in commutation via a request/response process.

FIG. 3 depicts an exemplary embodiment of a computing system 300 that includes a server 140 and a mobile device client node 110 that transmits data via, for example, a hypertext transfer protocol (HTTP). In the computer networked environment of FIG. 3, the networked computing device, e.g., server 140, may host a virtual network 144 computing server and the mobile device 110 may host a computing client where the client may access and send commands to the server. The mobile device 110 may be used to transmit information to and from the computing device in communication, e.g., networked, with the mobile device 110. In addition, the mobile device may execute one or more application programs. In some embodiments, the mobile device may execute an application program that may have access to all the resources offered by the mobile device, for example, camera, memory, GPS, Wi-Fi, and Bluetooth.

In an exemplary embodiment of the computing system 300 that includes a hypertext transfer protocol (HTTP) communication language, an HTTP request and an optional HTTP response may be used to establish a connection between the mobile device, i.e., client, and networked computing device, i.e., server. In some embodiments, the server may execute a set of one or more applications via the Operating System (OS) 142 that may be running on the server. The mobile device may also have an application set with functionality, for example, access to camera, memory, Bluetooth, Wi-Fi, GPS, and to operating system services, according to a set of rules; rules which may be defined per application, per set of applications, or per server. The set of applications may be executed in an environment that is adhering to the set of rules and capable of defining the scope and resources available to the application. Via the request 117 and response 119, the mobile device 110 and server 140 establish a communication medium in which photographs and relative data attributes associated with the photograph are transmitted to the server from the client for processing. Once the information has been verified and the server, via executing exemplary application set 150: Application 1, Application 2, Application n, identifies a set of users in the photograph, the server then makes that photograph available to all the users who appear in the photograph. This is done, via the steps outlined in the present application, and via using the facial recognition component in conjunction with Bluetooth information and history, Wi-Fi network IDs, and GPS information and trail. That is, once a user is identified in a photograph, that photograph, a preview of the photograph, or a link to the photograph, may be transmitted to the user devices whose users were identified in the photograph.

The computing system may use a push method to push the photographs and associated information and attributes from the mobile device, i.e., client, to the server computing device. Accordingly, "push" may be understood in this field of endeavor to refer to a process that a client uses to send data automatically, and in what may be termed a silent mode, to one or more configured server machines that are in communication with the network. Typically, no validation steps at the time of pushing are performed to confirm that the pushed photograph properly comprises the associated information/attributes; however, optionally, a validation step may be performed. For example, a validation step may comprise the mobile device first performing a facial detection check on the digital media, e.g., digital photograph or digital video, prior to pushing the data in order to determine whether any faces are present in the photograph or video. According to this facial detection check, only photographs or videos comprising faces that may be identified via the methods and facial detections described herein, may be pushed to the server for processing. Thereby, photographs or videos not containing any faces may be skipped in order to save bandwidth or data usage by the mobile device and reduce processing time by the server in order to increase performance and speed of processing.

In another embodiment, the device used in capturing the digital media may comprise a processor and memory, where the processor is configured to perform facial detection and facial recognition locally on the device. Therefore, the device is able to determine a subset of users, based on the information and attributes available and collected from other local devices, and locally perform facial recognition. Once another user is identified, the photograph may then be either pushed to the server for dissemination to the appropriate users or directly to the other user devices. Additionally, in an alternate embodiment, data comprising the information and attributes related to other devices may be collected locally and either transmitted or uploaded at a different rate than the rate at which it was collected, or may be sent on regular intervals to the server. Optionally, the capturing device may be collecting the information, e.g., Bluetooth of other devices and history, Location history, Wi-Fi network IDs connected to, and storing the information locally then uploading it once a digital media is captured and pushed to the server computing device. According to this embodiment, only data attributes associated with a captured photograph may be transmitted to the server computing device and once the subset is determined by the server computing device, the server computing device may transmit the subset of users to the device for performing facial recognition locally.

Figure 4:
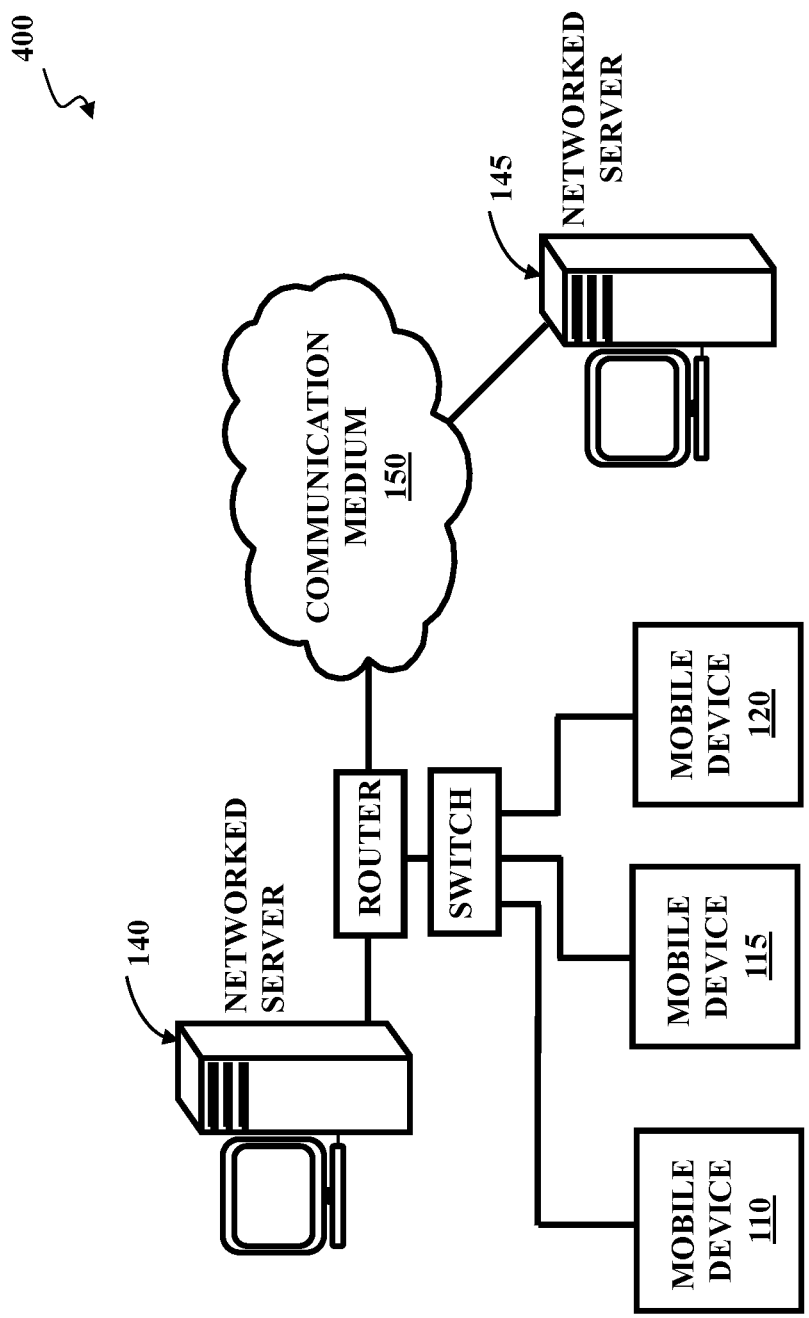
FIG. 4 depicts, in a functional block diagram, multiple networked servers communicating with a set of client devices via a communication medium.

FIG. 4 depicts a computing system where a number of mobile devices 110, 115, 120 are in communication with a number of networked servers 140, 145. In one embodiment, the networked servers 140, 145 may be accessible via the internet and so the mobile devices may push the photographs and related data attributes associated with the photographs via a switch and router (if connected via Wi-Fi) to the network server 140 upon the taking of the photograph. Once the networked servers 140, 145 receive and process the photographs from the mobile devices 110, 115, 120, they may then perform the steps disclosed herein. Since the networked server 140 is in communication with the networked server 145 via a communication medium 150, they may share resources for faster processing and also communicate with the mobile devices faster. That is, if the networked server 145 determines which users should be receiving the photographs—after they have been taken and sent to the networked server 145—it may then push the photographs to the other users using the networked server 140 it is in communication with. For example, mobile device 110 may take a photograph and push it to the networked server 145. Once determined that the users of mobile device 115 and mobile device 120 are in the picture as well, the networked servers 140, 145 may then push the photograph or a preview of it, to the other users so that they are accessible for them to view on their user device as well. Optionally, the networked servers 140, 145 may store a single instance of the photograph and associate the photograph with multiple user accounts who have been determined to be present in the photograph; that way, once each of the users log into their accounts, they may view the photographs.

Typically, the servers perform assigning of a unique serial number in order to track the users in a photograph. In one embodiment, the serial number may be in the form of a file name of the photograph. Serial numbers for user purposes typically represent a unique number associated with each copy of the photograph that is to be stored on the server or data store. Additionally, a unique serial number may be assigned to each face recognized—even if not identified—in the photograph. The digits of the serial number, when taken together, are not necessarily selected to communicate a meaning other than that of being a unique number to facilitate searching and identifying users and the photographs they are in. This function may be accomplished in real-time against the server or at a later time when internet access is available to the client device. In an environment where an internet connection is not available, other modes of validation may be used to validate the photographs, such as by the application running on the mobile device.

Embodiments of the computing system 400 also include a computer server hosted on a computing device comprising a processing unit and addressable memory, where the computer server may comprise: (a) a parsing component for analyzing and parsing a set of information input as relative information associated with a photograph file; (b) a data processing component for determining a value or unique serial number representing an association with the user or device based on the parsed information, for example, filename; and (c) a facial recognition component for recognizing human faces captured in the photograph and communicating with the computing device the recognized information, where the recognized information may comprise identification of users who have already created an account and signed up for the service or alternatively, of unknown users who have yet to create an account and upload their initial picture.

Figure 5A:
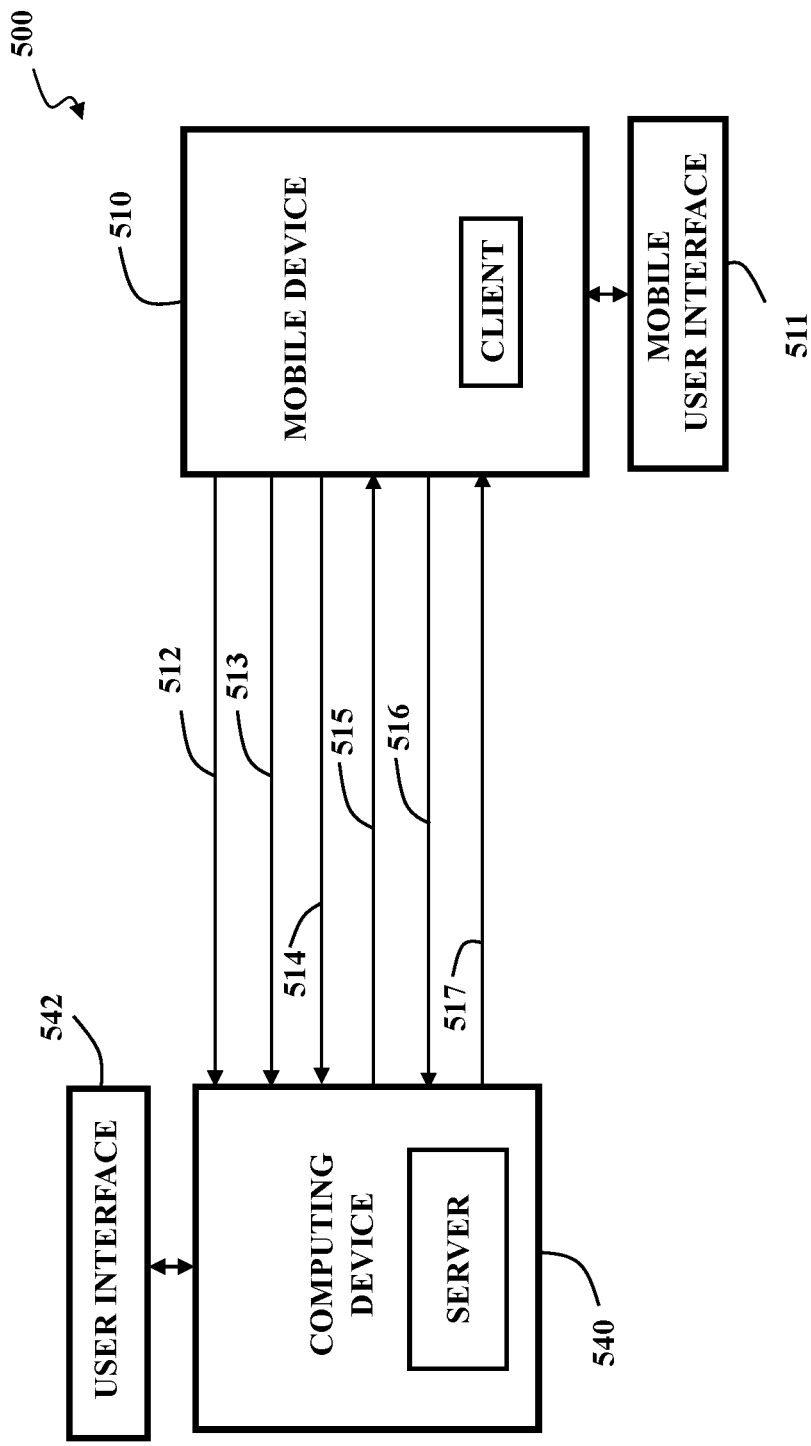
FIG. 5A depicts, in a functional block diagram, a communication sequence of message between a server device and client device.

FIG. 5A depicts an exemplary embodiment of a client server system 500 that includes a mobile device as a client node 510 and a computing device as a server node 540, where, at each node, computer instructions are present to execute a set of applications. The exemplary client node 510 may comprise a user interface 511, a data store, a communication interface, and a CPU having an OS configured to execute applications. The exemplary server node 540 may comprise a communication interface, a CPU having an OS configured to host a server and a data store. FIG. 5A further depicts in a top-level functional block diagram, an embodiment of a two-way communication established between a client 510 and a server 540. In some embodiments, for example, an HTTP request and an optional HTTP response may be used between the client 510 and the server 540 to establish the connection.

The client 510 and server 540 may communicate with each other via various means, including, for example, wired or wireless (e.g., Long-Term Evolution) network segments, where various protocols and markup languages may be used, such as transmission control protocol (TCP) over Internet Protocol (IP) —TCP/IP, hypertext transfer protocol (HTTP) with hypertext markup language (HTML), simple object access protocol (SOAP) with extensible markup language (XML), Secure Sockets Layer (SSL) for establishing an encrypted link, and other communication means adapted to operably connect the client 510 to the server 540 and with any other devices within the system 500. Additionally, other protocols for 1-way transmission to the receiving device, for example, iBeacon, Eddystone, Bluetooth beacon, infrared beacons, Near Field Communication (NFC), and Radio Frequency Identification (RFID) beacon may be used for controllable signal direction and range of data transmission.

The client 510 may comprise a user interface 511 thereby allowing a user to initiate communications with the server 540. The client 510 may communicate with the server 540 component via a socket connection and send data, e.g., HTTP connection requests 512, to the server 540. In some embodiments, the client 510 may connect to the server via an HTTP-encapsulation method. Optionally, the client 510 component may reside on a trusted external network host whereby the client 510 communicates with the server 540 and where the server 540 may reside on a protected network resource. Additionally, the client 510 may be deployed within a wireless network environment using high-speed data for mobile phones and data terminals.

In some embodiments, the client 510 may initiate the execution of an application via a command 513 that may include continual transmission of GPS, Bluetooth, and/or Wi-Fi as they are being collected. In some embodiments, the client 510 may direct the HTTP request to a uniquely assigned URL associated with each of the applications. An optional HTTP response from the server may be received at the client 510, signaling that the server will be listening to incoming communications and push notification from the client 510 mobile device. In one exemplary embodiment, once the client 510 device has taken a photograph, the photograph is pushed 514 to the server computing device for processing. Optionally, associated information and attributes may also be included as part of the pushed photograph. The server may acknowledge receipt of the photograph by sending a subsequent transmission 515. Upon receiving the acknowledgement, the client 510 may then send the relative information 516 associated with the photograph, i.e., Bluetooth, Wi-Fi, and GPS info, to the server—if available and even if previously sent. In one embodiment, if GPS, Bluetooth, or Wi-Fi information is not available, the client, i.e., user device, or alternatively, the server computing device 540 may substitute the most recently known and transmitted information until more updated information is received, thereby compensating for the scenario where the client 510 does not have any the information but the last set of data is still valid. That is, the client 510 may also save the information for future transmission 516 to the server when connectivity is available. The server 540 may signal to the client 510 that it has finished processing the photograph by sending a completed command 517 to the client 510.

Figure 5B:
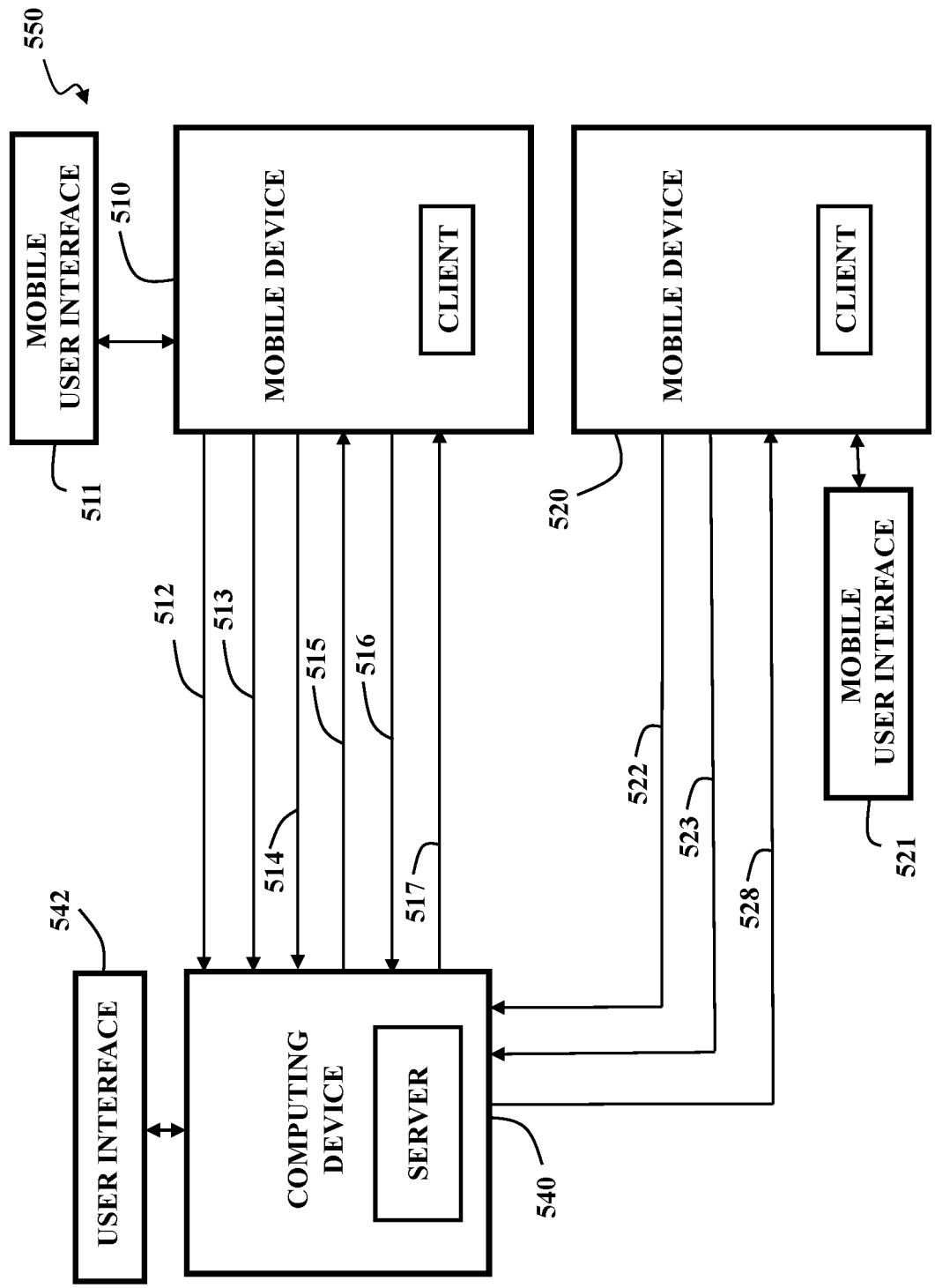
FIG. 5B depicts, in a functional block diagram, a communication sequence of message between a server device and multiple client devices.

FIG. 5B depicts an exemplary embodiment of a client server system 550 that includes a set of mobile devices as client nodes 510, 520 and a computing device as a server node 540, where, at each node, computer instructions are present to execute a set of applications. The client 520 may comprise a user interface 521 and may communicate with the server 540 component via a socket connection and send data, e.g., HTTP connection requests 522, to the server 540 similar to client 510. In some embodiments, the client 520 may initiate the execution of an application via a command 523 that may include continual transmission of GPS, Bluetooth, and/or Wi-Fi as they are being collected. In one exemplary embodiment, once the client 510 device has taken a photograph, the photograph is pushed 514 to the server computing device 540 for processing. Optionally, associated information and attributes may also be included as part of the pushed photograph. The server may acknowledge receipt of the photograph by sending a subsequent transmission 515. Upon receiving the acknowledgement, the client 520 may then send the relative information 516 associated with the photograph, i.e., Bluetooth, Wi-Fi, and GPS info, to the server—if available and even if previously sent. In one embodiment, if GPS, Bluetooth, or Wi-Fi information is not available, the clients 510, 520, i.e., user devices, or alternatively, the server computing device 540 may substitute the most recently known and transmitted information until more updated information is received, thereby compensating for the scenario where the clients 510, 520 do not have any the information but the last set of data is still valid. That is, the client 520 may also save the information for future transmission to the server when connectivity is available. The server 540 may signal to the client 510 that captured the photograph that it has finished processing the photograph by sending a completed command 517 to the client 510. Thereafter, the server computing device 540, based on the continual transmission of GPS, Bluetooth, and/or Wi-Fi received from client 520, having identified the user of client 520, may transmit the photograph or a preview of the photograph 528 to the client 520 for viewing.

In some embodiments, the server may execute a set of one or more applications via an OS that may be running on the server. The application set may function in a way so as to have access to a set of resources on the device, e.g., access to memory and to operating system services, according to a set of rules which may be defined per application, per set of applications, or per server. The set of applications may be executed in an environment where the server is in communication with a plurality of client mobile devices. In some embodiments, the server OS may assign the URLs to each application and the client may direct the HTTP request to the URL that is associated with the application. Optionally, once an application has terminated, for example, after successful completion or terminal failure—the application may return a response to the client. In exemplary embodiments, the client may be external to the server and optionally, the client may be outside of a network firewall. In the exemplary embodiments where the client may be outside of a network firewall, an HTTP encapsulation method may be used to access the server.

In a computer networked environment comprising a plurality of networked processing nodes, a first computing device may host a virtual network computing server that may be in communication with a second computing device which may host a virtual network computing server. In some embodiments, the first computing device may act as a remote or cloud environment, e.g., a remote or cloud server, and the second computing device may act as networked environment. The cloud server may deliver computing abilities and provide services such as: shared resources, shared software, and shared information to computers and other devices that may be part of a network. The networked environment may be a collection of user equipment, e.g., mobile phones or tablets, where the environment may facilitate the sharing of photographs taken by a set of user devices present and in communication with the first computing device (or server). In some embodiments, a server may be employed to manage the identification-related aspects, i.e., interactions and data, between a mobile device user and the server. In some embodiments, the first computing device may communicate with the second computing device via an authentication process. The authentication process may comprise: presenting a unique attribute and an associated authentication information by a user in exchange for verification of the user by an authentication provider. Optionally, the second computing device may reside in a network, where the network may comprise its own servers and clients, for example, comprised of computing devices operating in the client-server model and implemented as part of a wide area network (WAN). Optionally, the second computing device may reside in a network where the nodes may share physical proximity on a local area network (LAN).

Exemplary mobile devices may display an application showing options and features available for sending, pushing, or uploading photographs taken to a networked computing device. The mobile device display may comprise a top portion for displaying phone information, e.g., phone carrier, phone signal, time, battery life remaining, use of Wi-Fi, use of Bluetooth, and/or push notifications. Bluetooth is a wireless technology standard for exchanging data over short distances (using short-wavelength UHF radio waves in the ISM band from 2.4 to 2.485 GHz) from fixed and mobile devices. GPS is a space-based satellite navigation system that provides location and time information, anywhere on or near the earth where there is an unobstructed line of sight to four or more GPS satellites.

Figure 6:
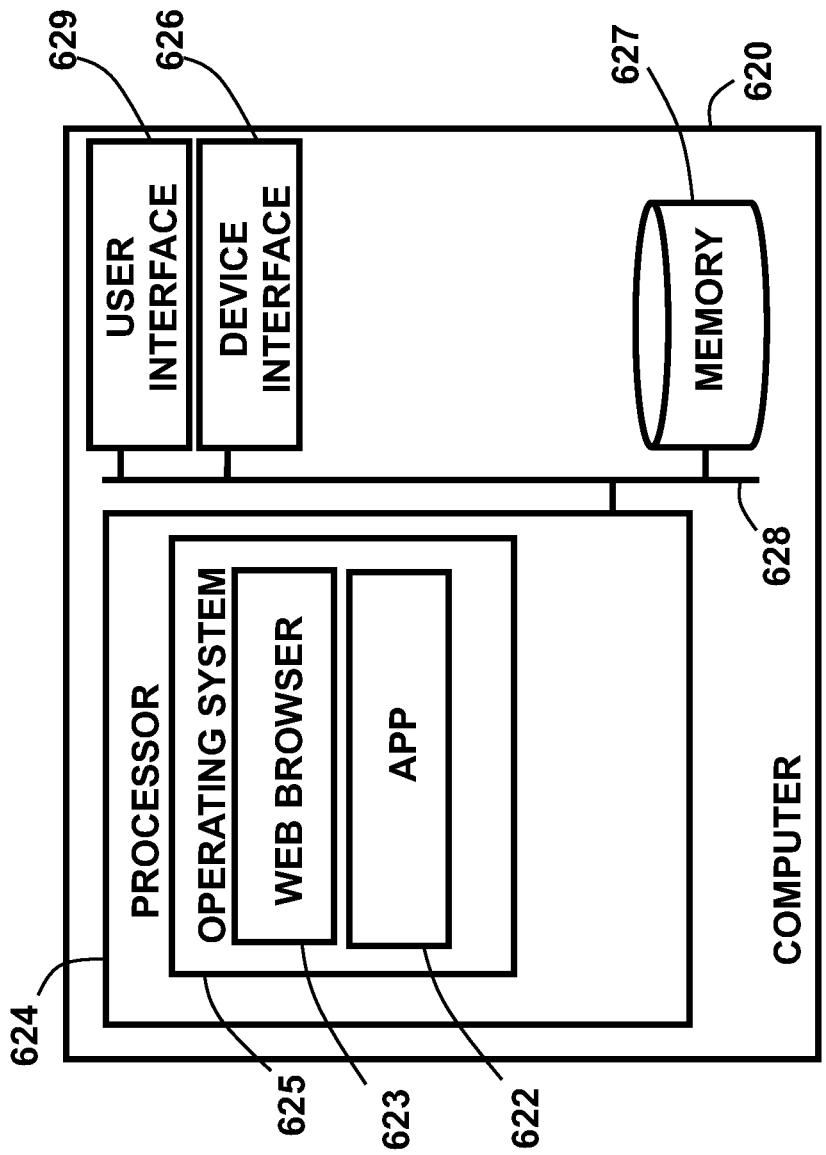
FIG. 6 depicts an exemplary embodiment of the computing device.

FIG. 6 illustrates an exemplary top level functional block diagram of a computing device embodiment 600. The exemplary operating environment is shown as a computing device 620 comprising a processor 624, such as a central processing unit (CPU), addressable memory 627, an external device interface 626, e.g., an optional universal serial bus port and related processing, and/or an Ethernet port and related processing, and an optional user interface 629, e.g., an array of status lights and one or more toggle switches, and/or a display, and/or a keyboard and/or a pointer-mouse system and/or a touch screen. Optionally, the addressable memory may, for example, be: flash memory, EPROM, and/or a disk drive or other hard drive. These elements may be in communication with one another via a data bus 628 via an operating system 625 such as one supporting a web browser 623 and applications 622, the processor 624 may be configured to execute steps of a process determining a subset of user photographs to perform facial recognition on and reducing the time necessary to perform such task on the entire set of available photographs. Additionally, the processor may be configured to determine a subset of user from an entire set of users, where each user may have multiple photographs associated with their accounts and accordingly, the processor may only perform facial recognition on the smaller set, i.e., subset, of users and their photographs, thereby allowing the computing system to continuously add newly identified photographs to the set of photographs used for comparison purposes of a user.

Figure 7:
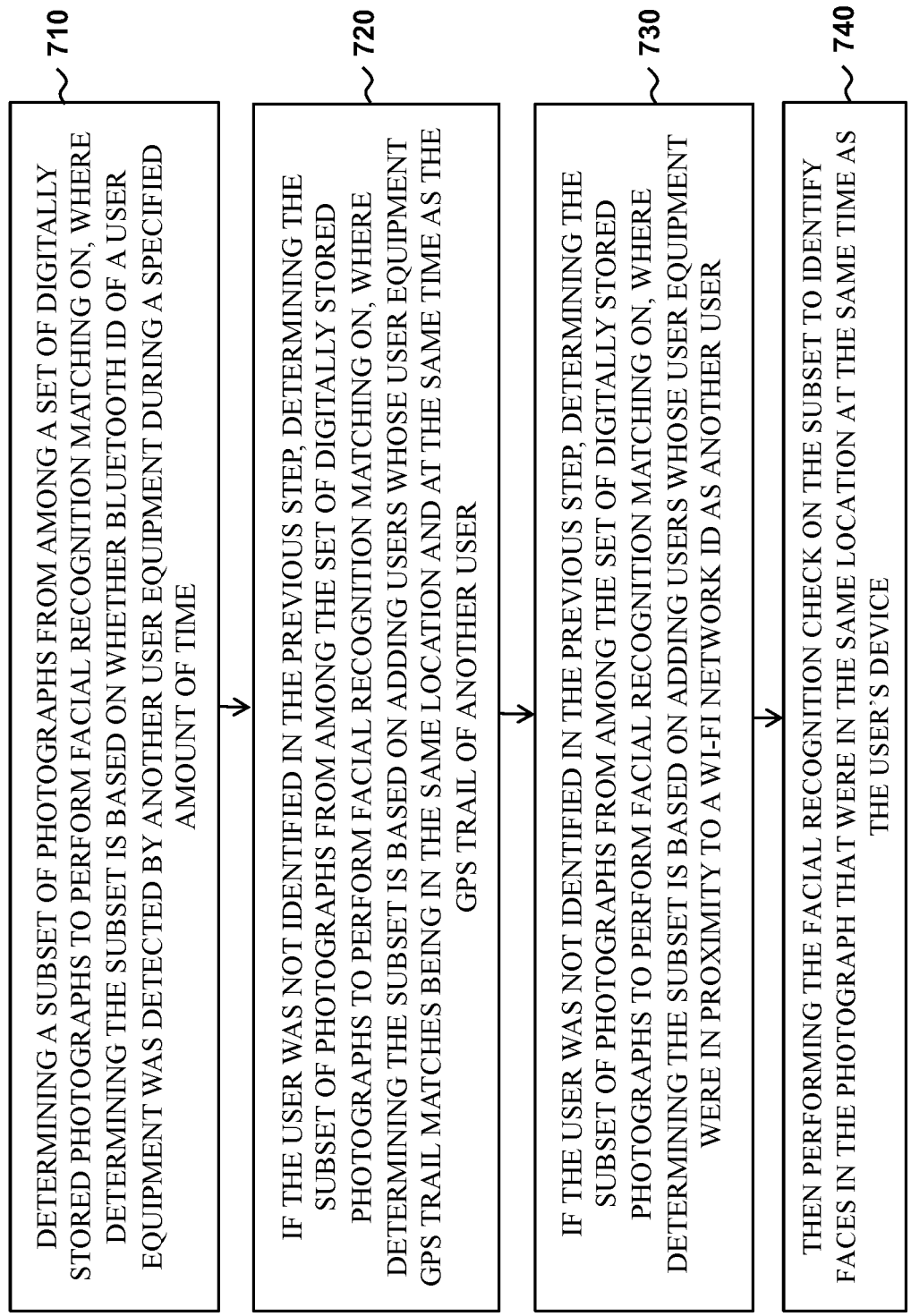
FIG. 7 depicts, in a top-level flowchart, an exemplary method of implementation of the server client communication.

FIG. 7 depicts embodiments that may include an exemplary method of implementation of a server computing device 700 performing facial recognition and identification of users present in a photograph. The exemplary method of the system and associated computing devices may comprise the following steps: (a) determining a subset of photographs from among a set of digitally stored photographs to perform facial recognition matching on, where determining the subset is based on adding users to the subset whose user equipment Bluetooth ID was detected by another user equipment during a specified amount of time; that is, whether the Bluetooth enabled devices were in close proximity of each other and the devices exchanged their Bluetooth ID with each other but not necessarily paired with each other. Accordingly, the server computing device determines whether another user was present in the photograph by creating a subset of photographs based on whether the users' devices were in contact with each other via tracking Bluetooth identification of the set of devices in the list of detected Bluetooth device history and if the Bluetooth ID matches a user already registered with the server computing device (step 710); if the user was not identified in the previous step, determining the subset of photographs from among the set of digitally stored photographs to perform facial recognition matching on, where determining the subset is based on adding users whose user equipment GPS trail matches being in the same location and at the same time as the GPS trail of another user (step 720); if the user was not identified in the previous step, determining the subset of photographs from among the set of digitally stored photographs to perform facial recognition matching on, where determining the subset is based on adding users whose user equipment were in proximity to a Wi-Fi network ID as another user (step 730); then performing the facial recognition check on the subset to identify faces in the photograph that were in the same location at the same time as the user's device based on the GPS, Bluetooth, and Wi-Fi information (step 740). Optionally, the server computing device may query the social media account of the user for any other users who may be linked to determine the subset of users and then perform the facial recognition check on the subset to determine whether any of the faces in the photograph are associated with the user's connections on social medial and identify them.

Accordingly, by using the resources available in a mobile device, tablet, or camera with smartphone capabilities running an application on the device, the user may share photographs taken at any time, for example, in an event, with other users in real-time or near real-time with great accuracy and based on a server computing device determining whether the other users are indeed present in the photograph and then automatically, and immediately, share the photograph with the user. Hence, when a user leaves an event, they may have all the photographs they were present in, whether or not it was taken using their camera device, at their account and saved on the server for their immediate viewing. By using the methods disclosed herein, the application running on the server may expeditiously and accurately determine which users were present in the photograph without the need to perform facial recognition checks on every photograph uploaded for every user—causing processor and time expensive operations to be performed by the processor. Additionally, the system does not need to have someone "tag" or identify users in a set of photographs which also gives way to error and unintended tagging of the wrong persons. The application running on the mobile device, along with the application running on the server computing device ensure that while the application is running, any photographs taken that include other users in them are immediately—in real-time—available to the other users. Therefore, by creating an account with the server, any user may login and view photographs taken of them no matter the device it was taken on. This independence from the device allows for and facilitates the sharing of photographs in which a user appears in without having to ask for or wait to be sent the photograph by the owner of the device being used to take the photograph. The possibility of mistakenly identifying a user by purely relying on facial recognition is also eliminated based on the added steps performed by the computing device and information received from the mobile devices. Additionally, based on first comparing simple data points and searches on databases with mainly string character data (e.g., Bluetooth ID, GPS location coordinates, social media connections), not only is the number of photographs on which facial recognition is performed reduced to a subset of the total number of available photographs, but also the users are guaranteed to receive an accurately recognized facial matching; also shortening the time it takes to make a facial recognition determination by a factor as described herein.

Accordingly, the server computing system disclosed herein may determine a subset of photographs for each user and for each time a facial image processing module is to be executed, thereby not having to perform facial image recognition on the full set of photographs which would use up processing power and require a longer time period to complete execution. Performing tasks on the subset may not only provide faster execution time, but also allow for a more precise result for the facial recognition, eliminating errors inherently introduced in such processes involving matching of human faces.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A system comprising a computing device, a first user equipment, and a set of user equipment;
   wherein the computing device comprises a processor and addressable memory, the processor configured to:
   receive a digital media, wherein the digital media is received from the first user equipment;
   perform facial detection check on the received digital media, wherein the facial detection is performed to detect one or more faces based on determination that one or more faces are present in the digital media;
   skip transmission of the digital media to the set of user equipment when no faces are detected, thereby conserving bandwidth and reducing server processing overhead; and
   transmit the digital media to the set of user equipment based on a successful detection of one or more faces;
   wherein the set of user equipment each comprises a processor and addressable memory, the processor configured to:
   determine whether there is a successful match via locally performing a facial recognition check on the received digital media via matching at least one facial image of the detected one or more faces in the received digital media with at least one locally stored facial image associated with a user of that user equipment without transmitting biometric data to the computing device; and
   transmit a signal to the computing device based on the successful match; and
   wherein the processor of the computing device is configured to:
   determine and update the association of the digital media with a subset of one or more user equipment from the set of user equipment based on receiving the signal indicating a successful match, the updating comprising adding each user equipment with a successful match to the subset of one or more user equipment thereby associating the digital media only with user equipment whose users appear in the digital media; and
   adding each user equipment with a successful match to the subset of one or more user equipment thereby identifying a set of one or more users who appear in the digital media; and
   make the digital media available to the user equipment of the determined subset of one or more user equipment thereby digital media not containing any faces matching any users are not made available and reduce processing time by the computing device wherein the computing device reduces network latency and processing overhead by refraining from transmitting or storing media for user equipment that fails to provide a successful match signal.

2. The system of claim 1, wherein the computing device stores a single instance of the digital media.

3. The system of claim 2, wherein the processor of the computing device is further configured to: associate the single instance of the digital media with the determined subset of user equipment.

4. The system of claim 3, wherein once a user of the subset of user equipment logs into their account, the digital media is available for viewing to the user.

5. The system of claim 1, wherein the system facilitates sharing of digital media with a set of user equipment present and in communication with the first user equipment.

6. A device comprising:
a processor and addressable memory, the addressable memory comprising a set of one or more rules, wherein the device is in communication with a first user equipment having a processor and addressable memory and a set of user equipment each having a processor and addressable memory, and wherein the processor is configured to:
receive a digital media, wherein the digital media is received from the first user equipment;
perform facial detection check on the received digital media, wherein the facial detection is performed to detect one or more faces based on determination that one or more faces are present in the digital media; and
skip transmission of the digital media to the set of user equipment when no faces are detected, thereby conserving bandwidth and reducing server processing overhead;
transmit the digital media to the set of user equipment based on a successful detection of one or more faces;
determine a subset of one or more user equipment from the set of user equipment based on receiving a transmitted signal from one or more user equipment from the set of user equipment, the signal indicating that a successful match was made by the user equipment via locally performing a facial recognition check on the received digital media, wherein the successful match is determined by matching at least one facial image of the detected one or more faces in the received digital media with at least one locally stored facial image associated with a user of that user equipment without transmitting biometric data to the computing device;
add each user equipment with a successful match to the subset of one or more user equipment thereby identifying and updating a set of one or more users who appear in the digital media, the updating comprising associating the digital media only with user equipment whose users appear in the digital media; and
make the digital media available to the user equipment of the determined subset of one or more user equipment thereby digital media not containing any faces matching any users are not made available and reduce processing time by the device wherein the computing device reduces network latency and processing overhead by refraining from transmitting or storing media for user equipment that fails to provide a successful match signal.

7. The device of claim 6, wherein the device stores a single instance of the digital media.

8. The device of claim 7, wherein the processor of the device is further configured to associate the single instance of the digital media with the determined subset of user equipment.

9. The device of claim 8, wherein once a user of the subset of user equipment logs into their account, the digital media is available for viewing to the user.

10. The device of claim 6, wherein the system facilitates sharing of digital media with a set of user equipment present and in communication with the first user equipment.

11. A method comprising:
receiving, by a computing device comprising a processor and addressable memory, a digital media, wherein the digital media is received from a first user equipment;
performing facial detection check on the received digital media, wherein the facial detection is performed to detect one or more faces based on determination that one or more faces are present in the digital media;
skipping transmission of the digital media to the set of user equipment when no faces are detected, thereby conserving bandwidth and reducing server processing overhead;
transmitting the digital media to the set of user equipment based on a successful detection of one or more faces;
determining a subset of one or more user equipment from the set of user equipment based on receiving a transmitted signal from one or more user equipment from the set of user equipment, the signal indicating that a successful match was made by the user equipment via locally performing a facial recognition check on the received digital media, wherein the successful match is determined matching at least one facial image of the detected one or more faces in the received digital media with at least one locally stored facial image associated with a user of that user equipment without transmitting biometric data to the computing device;
adding each user equipment with a successful match to the subset of one or more user equipment thereby identifying and updating a set of one or more users who appear in the digital media, the updating comprising associating the digital media only with user equipment whose users appear in the digital media; and
making the digital media available to the user equipment of the determined subset of one or more user equipment thereby digital media not containing any faces matching any users are not made available and reduce processing time by the computing device wherein the computing device reduces network latency and processing overhead by refraining from transmitting or storing media for user equipment that fails to provide a successful match signal.

12. The method of claim 11, wherein a single instance of the digital media is stored by the computing device.

13. The method of claim 12, further comprising: associating the single instance of the digital media with the determined subset of user equipment.

14. The method of claim 13, wherein once a user of the subset of user equipment logs into their account, the digital media is available for viewing to the user.

15. The method of claim 11, wherein the method facilitates sharing of digital media with a set of user equipment present and in communication with the first user equipment.

* * * * *